United States Patent [19]

Buchanan et al.

[11] Patent Number: 4,839,393

[45] Date of Patent: Jun. 13, 1989

[54] POLYURETHANE FOAMS CONTAINING ORGANOFUNCTIONAL SILANES

[75] Inventors: Michael S. Buchanan, Baltimore; Gregory B. Davis, Towson; Walter V. V. Greenhouse, Baltimore, all of Md.

[73] Assignee: Wm. T. Burnett & Co., Inc., Baltimore, Md.

[21] Appl. No.: 216,428

[22] Filed: Jul. 8, 1988

[51] Int. Cl.$^4$ .............................................. C08G 18/14
[52] U.S. Cl. ........................................ 521/53; 521/54; 521/55; 521/137; 521/170; 521/172; 521/173; 521/174; 521/176
[58] Field of Search ................... 521/53, 54, 55, 137, 521/170, 172, 173, 174, 176

[56] References Cited

U.S. PATENT DOCUMENTS

| | | | |
|---|---|---|---|
| 3,646,155 | 2/1972 | Scott | 260/827 |
| 4,117,063 | 9/1978 | Voigt et al. | 264/102 |
| 4,438,220 | 3/1984 | Fracalossi et al. | 521/55 |
| 4,438,221 | 3/1984 | Fracalossi et al. | 521/55 |
| 4,481,322 | 11/1984 | Godlewski et al. | 524/265 |
| 4,591,469 | 5/1986 | Buchanan et al. | 264/45.3 |
| 4,683,246 | 7/1987 | Davis et al. | 521/54 |

OTHER PUBLICATIONS

Union Carbide Corporation Brochure, "Union Carbide Silicones, Organofunctional Silanes—A Profile", pp. 1-36, 1983.

*Primary Examiner*—Maurice J. Welsh
*Attorney, Agent, or Firm*—A. W. Breiner

[57] ABSTRACT

Polyurethane foams based on reactive polyols and polyisocyanates containing a filler are modified with an organofunctional silane containing a hydrolyzable group and an ethylenically unsaturated linkage. The polyurethane foams have improved physical properties including improved stability, compression set, tear resistance, elongation, and tensile strength.

20 Claims, No Drawings

POLYURETHANE FOAMS CONTAINING ORGANOFUNCTIONAL SILANES

RELATED PATENTS

This application is related to commonly assigned U.S. Pat. Nos. 4,438,220; 4,438,221, and 4,683,246.

FIELD OF INVENTION

This invention relates to polyurethane foams containing a filler and an organofunctional silane. More particularly, this invention relates to polyurethane foam products comprising polyurethane foam chips in admixture with a filler material, such as inorganic flame retardants, bonded together with a polyurethane foam material and an organofunctional silane. The presence of the organofunctional silane provides to the polyurethane foam product improved physical properties including improved stability, compression set, tear resistance, elongation, and tensile strength.

BACKGROUND OF INVENTION

Polyurethane foams have been extensively used for various applications primarily due to the excellent and diverse physical properties of polyurethane foams. Polyurethane foams are available having soft and resilient characteristics rendering them useful in pillows and blankets. Other polyurethane foams have moderate load-bearing characteristics and as a result are widely used, for example, as seatings in furniture and as fillings for mattresses. Still other polyurethane foam compositions are relatively firm and find application in men's and women's apparel, packaging, thermal and acoustical insulation, and carpet underlay. The versatility and quality of the products that can be manufactured from polyurethane foam are related to the advances that have been made in the chemistry of raw materials used in the foams and in the technology that has evolved in the formulation and processing of materials into satisfactory and needed products.

In recent years it has become desirable or necessary to increase the flame retardancy of foams and/or to prevent the dripping of the hot melt of a foam product when subjected to high heat. These characteristics are collectively referred to for purposes of the present invention as the "combustion retardancy" of the foam. In rendering foams combustion retardant, various additives have been added to the polyurethane foams, including inorganic and organic fillers. Conventionally, these additives were incorporated into the foam at the time of the initial foaming. However, in commonly assigned U.S. Pat. No. 4,438,220 polyurethane foam products are described comprising a foam filled with a foam and containing large amounts of combustion retardant materials. The foam products of the '220 patent are prepared by foaming a polyurethane foam-forming diisocyanate and polyol around pre-formed polyurethane foam chips in admixture with solid combustion retardant materials. According to the '220 patent, it was found that foam products having larger amounts of inorganic flame-retardant materials, and accordingly greater combustion retardancy characteristics, could be fabricated when using the foam chips bonded together with new foam, than was possible in a conventional, in situ, foaming process. The products obtained according to the '220 patent have improved physical characteristics in comparison with the conventionally foamed combustion-retardant foams, rendering them particularly suitable for use in furniture upholstery, cushioning applications including in mattresses, and where special properties were required.

Commonly assigned U.S. Pat. No. 4,438,221 which relates to the '220 patent describes polyurethane foam products having large amounts of inorganic filler materials other than combustion-retardant materials which can be used in various applications. Commonly assigned U.S. Pat. No. 4,683,246 discloses the use of a fibrous material as a specific filler material.

Although the products described in the aforesaid commonly assigned patents are highly useful and have excellent physical characteristics enabling their use for many applications, it has now been found that physical characteristics of foam products including compression set, stability, tear resistance, elongation, and tensile strength can be improved by incorporating into the foam certain organofunctional silanes.

SUMMARY OF INVENTION

According to the present invention, polyurethane foam products are prepared in the manner described in the aforesaid U.S. Pat. Nos. 4,438,220; 4,438,221, and 4,683,246 patents, the disclosures thereof being incorporated herein by reference; wherein in the bonding operation whereby polyurethane foam chips and additives are bonded together, an organofunctional silane having ethylenically unsaturated linkage is added to the mixture. The organofunctional silane is believed to react during the bonding operation, coupling the organic phase of the polyurethane foam to the fillers. The presence of the organofunctional silane surprisingly enhances the stability, compression set, tear resistance, elongation, and tensile strength of the polyurethane foam products.

Although the organofunctional silanes are preferably used in the filled polyurethane products as described in the '220, '221 and '246 patents, the organofunctional silanes also can be used in other flexible polyurethane foams to enhance the physical characteristics of the foams.

GENERAL DESCRIPTION OF INVENTION

According to a preferred embodiment of the present invention, polyurethane foam chips are admixed with a filler material, such as a solid combustion-retardant material, natural or synthetic fibers or the like; and an organofunctional silane having ethylenic unsaturation; and thereafter binding the admixture with a resinous component, preferably a polyurethane foam-forming composition comprising the reaction product of a polyisocyanate and reactive polyol foamed with added water. The polyurethane foam particles, filler material and silane, are bonded into dimensionally stable, molded configurations. The characteristics of the products can be varied substantially by varying the amount and kind of filler material, polyurethane chips, silane, and binder in the composition relative to each other. For example, the products of the present invention utilizing foam chips in combination with fibers have unique advantages not obtained when fibers are incorporated into the foam without the silane.

The filler materials which are useful herein are the natural fibers such as cotton, wool, silk, hemp, flax, jute, and sisal; as well as synthetic fibers such as polyester fibers, nylon fibers, olefin fibers, rayon fibers, carbon fibers, glass fibers, and Aramid fibers, as fully defined in U.S. Pat. No. 4,683,246. Other filler materials which can be utilized are combustion-retardant materials as described in U.S. Pat. No. 4,438,220. As disclosed therein, a prferred combination of flame-retarding substances comprise solid substances in the form of finely-sized particles of hydrated alumina, also described as aluminum trihydrate ($Al_2O_3.3H_2O$ or $AL(OH)_3$), decabromodiphenyl oxide, and antimony trioxide, in combination with liquid substances such as tetrakis (2-chloroethyl) ethylene diphosphate (commercially available as Thermolin 101), and tetrakis (2-chloroethyl) dichloroneopentyl diphosphate (commercially available as Antiblaze 100). Still other filler materials which can be used according to this invention are those described in U.S. Pat. No. 4,438,221 and include graphite, carbon particles, or metal filings such as lead filings to impart select characteristics to the foam products such as conductivity or to improve the sound absorption and acoustical properties; various fillers such as polymer powders, mineral wool fibers or particles, sawdust, cork, and pigments to impart various other useful characteristics; antistatic additives, or materials such as polyvinylchloride powders to modify the characteristics of the foam to permit dielectric sealing of the foam to other foam surfaces or to surfaces such as polymer films exemplified by polyvinylchloride films; light absorber or light stabilizer powders such as the hindered amines; antioxidants such as the hindered phenols; natural soaps and synthetic detergents including compositions having antibiotic, antiseptic, disinfectant, antiviral, and sterilizing effects; beads including glass beads, organic polymer beads such as polystyrene beads, inorganic beads such as alumina or glass bubbles to increase the volume of the foams while controlling lightness in weight; ground rubber or ground elastomeric materials. The selection of the filler will modify the properties of the final polyurethane foam products.

The shredded or ground flexible polyurethane foam as well as the foam binder used to bond the particles of foam and solid materials to form a foamed structure suitable for use according to the present invention are derived from reactive hydroxy-terminated polyester or polyether polyols which are reacted with organic polyisocyanates in the presence of suitable catalysts, surfactants, and blowing agents. To obtain a flexible foam, it is necessary to foam with some water.

The organofunctional silanes useful in this invention contain at least one silicone-bonded hydrolyzable group, e.g., alkoxy, halogen, acryloxy, and the like; and at least one silicone-bonded ethylenically unsaturated group. Any remaining valences of silicone not satisfied by a hydrolyzable group or ethylenically unsaturated group are bonded to a monovalent hydrocarbon group, such as methyl, ethyl, propyl, isopropyl, butyl, pentyl, isobutyl, isopentyl, octyl, decyl, cyclohexyl, cyclopentyl, benzyl, phenyl, phenylethyl, naphthyl, and the like. Suitable silanes include those represented by the formula.

$$R_aSiX_bY_c$$

wherein R is a monovalent hydrocarbon group; X is a silicone-bonded hydrolyzable group; Y is a silicone-bonded monovalent organic group containing at least one vinyl-polymerizable unsaturated bond; a is an integer of 0 to 2, preferably 0; b is an integer of 1 to 3, preferably 3; c is an integer of 1 to 3, preferably 1; and a+b+c is equal to 4. Materials falling within this formula include vinyltriethoxysilane, gamma-methacryloxypropyltrimethoxysilane, vinyltri(2-methoxyethoxy) silane, vinyltrimethoxysilane, vinyltrichlorosilane, gamma(meth)acryloxypropyltri(2-methoxyethoxy)silane, gamma-acryl-oxypropyltriethoxysilane, vinyltriacetoxysilane, ethynyltriethoxysilane, 2-propynyltrichlorosilane, and the like. It is believed that the silicone-bonded hydrolyzable groups of the silanes react through hydrolysis with groups such as a hydroxy group or water contained on or in the filler material to couple the silane to the filler. In addition, the silanes containing ethylenic unsaturated groups polymerize under the foaming or bonding conditions, possibly with the groups of the polyurethane foam.

It is also possible, and at times may be desirable, to use an organic crosslinking component along with the silane. Suitable crosslinking components are unsaturated organic compounds having at least two ethylenically unsaturated groups which are free of any group or element which will adversely affect the function of the polyurethane product. Particularly suitable compounds are those based on (meth)acrylic acid and include 1,4-butylene glycol di(meth)acrylate, diethylene glycol di(meth)acrylate, pentaerythritol tri(meth)acrylate, polycaprolactone tri(meth)acrylate, penta(meth)acrylate, melamine tri(meth)acrylate, epoxidized linseed oil/(meth)acrylate, tri(meth)acryloyl hexahydro-s-triazine, N,N-tetra(meth)acryloyl 1,6-diaminopyridine, 1,3-butylene glycol di(meth)acrylate, ethylene glycol di(meth)acrylate, ethylene glycol di(meth)acrylate, triethylene glycol di(meth)acrylate, polyethylene glycol di(meth)acrylate, and trimethylol propane tri(meth)acrylate. "Meth" in parentheses, as used herein, embraces either the derivative of acrylic or methacrylic acid. Other ethylenically unsatuated compounds which can be used include divinyl sulfone, dicyclopentadiene, triallyl cyanurate, acetyl triallyl citrate, divinyl benzene, polybutadiene oligomers, including hydroxyl terminated polybutadiene oligomers, hydroxyl terminated styrene-butadiene, and the like. The crosslinking agent can react with the organofunctional silane to provide silanes having high ratios of unsaturated groups to molecular weight.

Relatively low molecular weight polysiloxane oligomers such as the poly(methylvinylsiloxane) tetramer can be used in place of the polymerizable unsaturated hydrolyzable silane. Suitable low molecular weight vinyl-polymerizable unsaturated polysiloxane oligomers that can be used in place of or in addition to the vinyl-polymerizable unsaturated, hydrolyzable silanes can be represented by the average formula $$R_g[R_dY_{2-d}SiO]_e[R_2SiO]_f[SiR_3]_g$$

wherein R and Y are as defined hereinabove; d is an integer of 0 or 1; e is an integer of 1 to 4; f is an integer of 0 to 3; g is an integer of 0 to 1; e+f+g is an integer of 1 to 5, and d can be the same of different in each molecule. The oligomers covered by this formula include the cyclic trimers, cyclic tetramers and the linear dimers, trimers, tetramers and pentamers. The vinyl-polymerizable unsaturated silicone compounds, thus, contain one to 5 silicone atoms interconnected by ≡Si-OSi≡ linkages when the compounds contain multiple silicone atoms per molecule, contain at least one silicone-bonded vinyl-polymerizable unsaturated group and are hydrolyzable, in the case of silanes, by virtue of at least one silicone-bonded hydrolyzable group. Any valences of silicone not satisfied by a divalent oxygen atom in a ≡SiOSi≡ linkage, by a silicone-bonded hydrolyzable group or by a silicone-bonded vinyl-polymerizable unsaturated group is satisfied by a monovalent hydrocarbon group free of vinyl-polymerizable unsaturation. The vinyl-polymerizable unsaturated, hydrolyzable silanes are preferred in most cases.

As is apparent, the critical feature of the organofunctional silanes which are used according to this invention must contain a hydrolyzable group and an ethylenically unsaturated group. The chemistry of organofunctional silanes are described in a brochure of the Union Carbide Corporation entitled "Union Carbide Silicones, Organofunctional Silanes—A Profile," pages 1-36, 1983. The silanes are marketed commercially by Union Carbide under the tradename UCARSIL such as UCARSIL FR-1A and UCARSIL PC-1A.

The ratio or proportion of materials used herein can very over a substantial range and obtain desirable characteristics in the foam. It has been found, however, that for each 100 parts of polyurethane foam chips, the fillers should be used in an amount of from about 10 to 500 parts, preferably 25 to 200 parts, and optimally from about 50 to 150 parts. The binder is preferably a polyurethane foam binder. However, other binders can be employed, including the non-foam polyurethane binders, the resinous acrylates, latex binders, and epoxy air-drying or heat-setting resins. The amount of binder for 100 parts of polyurethane foam chips is preferably from about 10 to about 250 parts. It has been found that the binder promotes product resiliency. Preferably, therefore, when using the larger amounts of filler, larger amounts of the binder should also be used. The organofunctional silanes can be used in an amount of from about 0.5 to about 20 parts for 100 parts of polyurethane foam. The crosslinking agent, when used, can be present at a ratio of from about 0.5:1 to about 4:1 with respect to the silane.

Foam products according to the present invention are made by providing a mixture of the select fillers, shredded polyurethane foam or polyurethane foam chips, then applying organofunctional silane, crosslinking agent, and resinous binder, preferably a polyurethane foam composition, to the mixture; and thereafter curing the mixture in the presence of heat and in the event the binder is a polyurethane foam-forming binder in the presence of water to provide a foaming action. The product is shaped in a suitable mold. A preferred apparatus and method are described in commonly assigned U.S. Pat. No. 4,591,469.

While the invention has been described primarily in reference to polyurethane foam products based on polyurethane foam chips or shredded polyurethane foam, as stated hereinbefore the organofunctional silanes as above described have application in conventional polyurethane foams. The presence of the organofunctional silanes provides improved tear resistance, greater elongation, and greater tensile strength.

PRESENTLY PREFERRED EMBODIMENTS

Presently preferred embodiments for producing foam products according to the present invention based on polyurethane foam chips are as follows: A pre-polymer mix comprising a polyether polyol having a molecular weight in the range of about 3000 to 6500 mixed with toluene diisocyanate in a weight ratio of 68% polyol and 32% toluene diisocyanate. The mixture includes a minor amount of catalyst. The organofunctional silane is added to this mixture. Additional foam-forming formulations which are suitable for use according to the present invention are described in earlier-referred to U.S. Pat. Nos. 4,438,220 and 4,438,221, incorporated herein by reference.

The pre-polymer mix is charged to a sprayer unit. Polyurethane foam chips and selected filler(s), in an amount as defined in the specific examples, are charged to a mixer and mixed to provide a uniform mixture. While rotating the mixture, the above-prepared pre-polymer in the amount stated in the specific examples is sprayed onto the mixture to obtain a uniform distribution. After the blending the mixture is charged to a mold, with the mixture being distributed to provide a slightly increased height of the mixture at the edges of the mold. The mold is closed and curing is accomplished with steaming. A preferred method of forming the foam buns is defined in above-noted U.S. Pat. No. 4,591,469, the disclosure being incorporated herein by reference.

EXAMPLE 1

| Components | Parts |
| --- | --- |
| Polyether Urethane Foam Chips ⅜" | 956 |
| Cotton Linters | 239 |
| Wool | 239 |
| Polyol | 219 |
| Toluene Diisocyanate | 108 |
| 1,1,1-Trichloroethane (Solvent) | 50 |
| Triethylenediamine Catalyst | trace |
| Flame Retardants: | |
| Antimony Trioxide | 53 |
| Boric Acid | 297 |
| Chlorinated Paraffin | 154 |
| Decabromodiphenyl Oxide | 100 |
| Melamine | 148 |
| Tri-(1,3-Dichloroisopropyl) Phosphate | 87 |
| Total | 2650 |

This foam which is a control and does not contain an organofunctional silane is characterized in that the physical properties demonstrate the following:

| | |
| --- | --- |
| Density | 3.05 lbs/ft$^3$ |
| 25% Indentation Load Deflection | 50 lbs |
| Tear Resistance | 1.38 ppi |

EXAMPLE 2

| Components | Parts |
| --- | --- |
| Polyether Urethane Foam Chips ⅜" | 941 |
| Cotton Linters | 234 |
| Wool | 234 |
| Polyol | 244 |
| Toluene Diisocyanate | 120 |
| 1,1,1-Trichloroethane (Solvent) | 50 |
| Triethylenediamine Catalyst | trace |
| Flame Retardants: | |
| Antimony Trioxide | 55 |
| Boric Acid | 294 |
| Chlorinated Paraffin | 149 |
| Decabromodiphenyl Oxide | 100 |
| Melamine | 144 |
| Tri-(1,3-Dichloroisopropyl) Phosphate | 85 |
| *Organofunctional Silane | 8 |

-continued

| Components | Parts |
|---|---|
| Total | 2658 |

*This silane is a mixture of gamma-methacryloxypropyltrimethoxysilane having the formula -

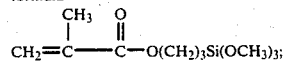

trimethylol propane triacrylate having the formula -

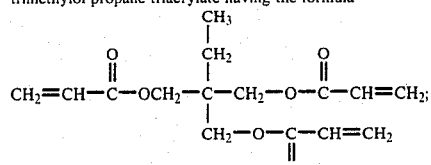

and a surfactant having the formula -

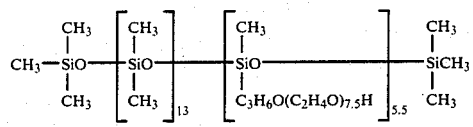

in a 1:1:0.3 weight ratio.

This foam is characterized by an increase in tear resistance compared to Example 1:

| Density | 3.03 lbs/ft$^3$ |
|---|---|
| 25% Indentation Load Deflection | 55 lbs |
| Tear Resistance | 1.58 ppi |

EXAMPLE 3

| Components | Parts |
|---|---|
| Polyether Urethane Foam Chips ⅜" | 1309 |
| Cotton Linters | 1309 |
| Polyol | 216 |
| Toluene Diisocyanate | 108 |
| Triethylenediamine Catalyst | trace |
| 1,1,1-Trichloroethane (Solvent) | 5 |
| Total | 2947 |

This foam which is a control and does not contain an organofunctional silane is characterized in that the physical properties demonstrate the following:

| Density | 3.55 lbs/ft$^3$ |
|---|---|
| 25% Indentation Load Deflection | 55 lbs |
| Tear Resistance | 1.63 ppi |
| Compression Set (50% Compression) | 18.0% |

EXAMPLE 4

| Components | Parts |
|---|---|
| Polyether Urethane Foam Chips ⅜" | 1309 |
| Cotton Linters | 1309 |
| Polyol | 216 |
| Toluene Diisocyanate | 108 |
| Triethylenediamine Catalyst | trace |
| 1,1,1-Trichloroethane (Solvent) | 5 |
| Organofunctional Silane | 21 |
| Total | 2968 |

This foam is characterized by an increase in tear resistance and better compression sets compared to Example 3:

| Density | 3.47 lbs/ft$^3$ |
|---|---|
| 25% Indentation Load Deflection | 60 lbs |
| Tear Resistance | 1.88 ppi |
| Compression Set (50% Compression) | 16.5% |

EXAMPLE 5

| Components | Parts |
|---|---|
| Polyether Urethane Foam Chips ½" | 1435 |
| Polyol | 352 |
| Toluene Diisocyanate | 173 |
| Triethylenediamine Catalyst | trace |
| Flame Retardants: | |
| Alumina Trihydrate | 1587 |
| Antimony Trioxide | 131 |
| Boric Acid | 288 |
| Chlorinated Paraffin | 66 |
| Chloroalkyl Diphosphate Ester | 134 |
| Tetrakis (2-Chloroethyl) Phosphate | 134 |
| Tri-(2-Chloroethyl) Phosphate | 58 |
| Total | 4358 |

This foam which is a control and does not contain an organofunctional silane is characterized by its ability to demonstrate superb flammability characterized and has the following physical properties:

| Density | 5.5 lbs/ft$^3$ |
|---|---|
| Elongation | 63% |
| Compression Set (50% Compression) | 10.5% |

EXAMPLE 6

| Components | Parts |
|---|---|
| Polyether Urethane Foam Chips ½" | 1434 |
| Polyol | 352 |
| Toluene Diisocyanate | 173 |
| Triethylenediamine Catalyst | trace |
| Flame Retardants: | |
| Alumina Trihydrate | 1434 |
| Antimony Trioxide | 131 |
| Boric Acid | 288 |
| Chlorinated Paraffin | 66 |
| Chloroalkyl Diphosphate Ester | 134 |
| Tetrakis (2-Chloroethyl) Phosphate | 134 |
| Tri-(2-Chloroethyl) Phosphate | 58 |
| Organofunctional Silane | 18 |
| Total | 4222 |

This foam is characterized by its ability to demonstrate superb flammability characteristics and better physical properties compared to Example 5:

| Density | 5.5 lbs/ft$^3$ |
|---|---|
| Elongation | 77% |
| Compression Set (50% Compression) | 9.0% |

EXAMPLE 7

| Components | Parts |
|---|---|
| Polyether Urethane Foam Chips ½" | 604 |
| Polyester Fibers | 604 |
| Polyol | 163 |
| Toluene Diisocyanate | 81 |
| Triethylenediamine Catalyst | trace |

-continued

| Components | Parts |
|---|---|
| 1,1,1-Trichloroethane (Solvent) | 300 |
| Total | 1752 |

This foam which is a control and does not contain an organofunctional silane is characterized by the following physical properties:

| | | |
|---|---|---|
| Density | 2.50 | lbs/ft³ |
| Tear Resistance | 2.05 | ppi |
| Compression Set (50% Compression) | 20.1% | |

EXAMPLE 8

| Components | Parts |
|---|---|
| Polyether Urethane Foam Chips ½" | 604 |
| Polyester Fibers | 604 |
| Polyol | 163 |
| Toluene Diisocyanate | 81 |
| Triethylenediamine Catalyst | trace |
| 1,1,1-Trichloroethane (Solvent) | 300 |
| Organofunctional Silane | 8 |
| Total | 1760 |

This foam is characterized by better physical properties than Example 7:

| | | |
|---|---|---|
| Density | 2.50 | lbs/ft³ |
| Tear Resistance | 3.25 | ppi |
| Compression Set (50% Compression) | 17.7% | |

EXAMPLE 9

A flexible polyester urethane foam having a formulation containing relatively high amounts of flame-retardant additive:

| Formula | Parts |
|---|---|
| Polyester Resin (60-hydroxyl) | 100 |
| Toluene Diisocyanate | 64.5 |
| N—Ethyl Morpholine | 0.7 |
| N—Coco Morpholine | 1.0 |
| Dimethylcetylamine | 0.2 |
| Niax Y6353 (a polyalkyleneoxidemethylsiloxane copolymer surfactant marketed by Union Carbide) | 0.5 |
| Niax L536 (a polyalkyleneoxidemethylsiloxane copolymer surfactant marketed by Union Carbide) | 0.55 |
| Fomrez B320 (an organosilicone coupling agent surfactant marketed by Witco) | 0.65 |
| Tri(2-dichloroisopropyl) Phosphate | 15 |
| Tri(2-chloroethyl) Phosphate | 5 |
| Cornstarch (10% water) | 5 |
| Pentabromodiphenyloxide (85% in aromatic phosphate ester plasticizer) | 8 |
| Aqueous Carbon Black Dispersion (69% water) | 3.0 |
| Water | 2.25 |

This foam which is a control and does not contain an organofunctional silane is characterized by the following physical properties:

| | | |
|---|---|---|
| Density | 1.80 | lb//ft³ |
| Tear Resistance | 1.31 | ppi |
| Elongation | 87% | |

| | | |
|---|---|---|
| Tensile Strength | 19 | psi |

EXAMPLE 10

Example 9 was re-run exactly except for the addition of 0.1 parts organofunctional silane.

This foam is characterized by its better physical properties than Example 9:

| | | |
|---|---|---|
| Density | 1.89 | lbs/ft³ |
| Tear Resistance | 1.92 | ppi |
| Elongation | 116% | |
| Tensile Strength | 20.7 | psi |

As will be apparent to one skilled in the art, various modifications can be made within the scope of the aforesaid description. Such modifications being within the ability of one skilled in the art form a part of the present invention and are embraced by the appended claims.

It is claimed:

1. A polyurethane foam structure obtained through the steps of (a) providing an admixture of flexible polyurethane foam and a filler material; (b) uniformly applying to said mixture of (a) a liquid flexible resinous binding agent, said admixture of (a) or said binding agent including an organofunctional silane having at least one hydrolyzable group and one ethylenically unsaturated group; and (c) curing said composition of (b) so as to provide a cured foam structure; the relative amounts of materials in said foam structure being such that for each 100 parts by weight of polyurethane foam particles about 10 to 500 parts of filler material; about 0.2 to about 20 parts organofunctional silane, and about 10 to 250 parts of binding agent is employed.

2. The structure according to claim 1 wherein said binding agent is a liquid flexible polyurethane foam-forming material containing a reactive polyol and a polyisocyanate, and in the curing of step (c) the foam-forming material is foamed with water to provide a flexible foam having bonded therein said polyurethane foam particles and said filler material.

3. The structure according to claim 2 wherein said filler mtaerial includes a fibrous material having a fiber length of from about ¼" to 1½", a density of from 0.90 to 1.75, and a diameter of less than about 100 microns.

4. The structure according to claim 3 wherein said fibrous material has a fiber length of from about ¼" to ¾".

5. The structure according to any of claims 1-4 wherein said filler material includes a solid combustion retardant.

6. The structure according to claim 5 wherein said admixture of (a) includes an organic crosslinking agent having at least two ethylenic double bonds.

7. The structure according to claim 6 wherein said crosslinking agent is a derivative of (meth)acrylic acid.

8. The structure according to claim 7 wherein said particles of polyurethane foam are obtained from the reaction product of a polyether polyol and a polyisocyanate foamed with water.

9. The structure according to claim 7 wherein said particles of polyurethane foam are obtained from the reaction product of a polyester polyol and a polyisocyanate foamed with water.

10. The structure according to claim 3 wherein said liquid flexible foam-forming material contains a reactive polyester polyol.

11. The structure according to claim 3 wherein said liquid flexible foam-forming material contains a reactive polyether polyol.

12. A polyurethane foam comprising the reaction product of a reactive polyol, a polyisocyanate, an organofunctional silane having at least one hydrolyzable group and one ethylenically unsaturated group, and water; the relative amounts of materials in said foam being such that each 100 parts by weight of polyurethane foam, based on the reactive polyol and polyisocyanate, contains from about 0.05 to about 20 parts organofunctional silane.

13. The foam according to claim 12 containing up to about 500 parts filler material for each 100 parts foam.

14. The foam according to claim 13 wherein said filler material includes a solid combustion retardant.

15. The foam according to claim 14 wherein said reaction product includes an organic crosslinking agent having at least two ethylenic double bonds.

16. The foam according to claim 15 wherein said crosslinking agent is a derivative of (meth)acrylic acid.

17. The foam according to claim 16 wherein said polyol is a polyether polyol.

18. The foam according to claim 16 wherein said polyol is a polyester polyol.

19. The foam according to claim 17 wherein said polyisocyanate is toluene diisocyanate.

20. The foam according to claim 18 wherein said polyisocyanate is toluene diisocyanate.

* * * * *